United States Patent
Wolczko et al.

(10) Patent No.: US 6,931,504 B2
(45) Date of Patent: Aug. 16, 2005

(54) METHOD AND APPARATUS FOR RELOCATING OBJECTS WITHIN AN OBJECT-ADDRESSED MEMORY HIERARCHY

(75) Inventors: Mario I. Wolczko, San Carlos, CA (US); Matthew L. Seidl, Longmont, CO (US); Gregory M. Wright, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 259 days.

(21) Appl. No.: 10/431,116

(22) Filed: May 6, 2003

(65) Prior Publication Data

US 2004/0225849 A1 Nov. 11, 2004

(51) Int. Cl.[7] ............................................. G06F 12/00
(52) U.S. Cl. ...................................... 711/165; 711/206
(58) Field of Search ................................ 711/165, 206; 707/206

(56) References Cited

U.S. PATENT DOCUMENTS 6,249,793 B1 * 6/2001 Printezis et al. ............ 707/206
6,286,088 B1 * 9/2001 Campbell et al. ........... 711/165
6,865,585 B1 * 3/2005 Dussud ....................... 707/206

* cited by examiner

Primary Examiner—Hiep T. Nguyen
(74) Attorney, Agent, or Firm—Park, Vaughan & Fleming LLP

(57) ABSTRACT

One embodiment of the present invention provides a system that facilitates relocating an object in a computer system that provides an object-addressed memory hierarchy. During operation, the system receives a new address specifying to where the object is to be relocated in main memory. The system then retrieves an object table entry associated with the object. This object table entry contains a current address for the object, which is used to translate an object identifier for the object into a corresponding physical address for the object in main memory. Next, the system clears an evicted indicator from the object table entry, wherein the evicted indicator is set whenever the object is modified in main memory. The system then copies the object from the current address to the new address. After copying is complete, the system performs an atomic operation that swaps the current address in the object table entry with the new address if the evicted indicator remains clear.

23 Claims, 3 Drawing Sheets

METHOD AND APPARATUS FOR RELOCATING OBJECTS WITHIN AN OBJECT-ADDRESSED MEMORY HIERARCHY

BACKGROUND

1. Field of the Invention

The present invention relates to the design of computer systems that support objects defined within an object-oriented programming system. More specifically, the present invention relates to a method and an apparatus for relocating objects within an object-addressed memory hierarchy in a computer system that supports concurrent execution.

2. Related Art

Objects defined within an object-oriented programming system are frequently relocated within memory for purposes of garbage collection or compaction. This relocation process is relatively straightforward in a uniprocessor system in which only a single processor can modify memory at a given time. However, this process is significantly more complicated in systems that support concurrent execution.

In such systems, it is possible for processors to interfere with each other during the relocation process. For example, it is possible for different processors to update pointers to the object in an inconsistent manner. However, this is not a problem in a computer system that supports an object-addressed memory hierarchy, wherein objects are addressed through object identifiers that are translated into corresponding physical addresses for the objects. This translation process involves using an object identifier to look up an object table entry that contains a physical address for the object. Since the physical address for the object is located in only one place (the object table entry), it is not necessary to update multiple pointers to the object. Instead, updating the physical address in the object table entry will cause subsequent references to the object to use the new address.

Unfortunately, even in computer systems that provide an object-addressed memory hierarchy, processors can still interfere with each other during the object relocation process. For example, a first processor can possibly modify an object while the object is being relocated by a second processor. In this case, some of the modifications made by the first processor can possibly be lost if the modifications are made to an old version of the object, after the second processor has copied corresponding portions of the object to the new location.

Of course, it is possible to solve this problem by stopping all processing activity within the computer system while compaction and garbage collection operations take place. However, doing so greatly decreases computer system performance.

Hence, what is needed is a method and an apparatus for relocating objects within a computer system that supports concurrent execution without the above-described problems.

SUMMARY

One embodiment of the present invention provides a system that facilitates relocating an object in a computer system that supports concurrent execution and provides an object-addressed memory hierarchy. During operation, the system receives a new address specifying to where the object is to be relocated in main memory. The system then retrieves an object table entry associated with the object. This object table entry contains a current address for the object, which is used to translate an object identifier for the object into a corresponding physical address for the object in main memory. Next, the system clears an evicted indicator from the object table entry, wherein the evicted indicator is set whenever the object is modified in main memory. The system then copies the object from the current address to the new address. After copying is complete, the system performs an atomic operation that swaps the current address in the object table entry with the new address if the evicted indicator remains clear.

In a variation on this embodiment, if the copying is complete and the evicted indicator has been set, the system repeats the steps of clearing the evicted indicator, copying the object, and selectively performing the atomic operation until the object table entry is successfully updated to contain the new address.

In a variation on this embodiment, retrieving the object table entry involves: receiving the object identifier for the object; using the object identifier to generate an address for the object table entry associated with the object; and using the address to retrieve the object table entry.

In a variation on this embodiment, the evicted indicator comprises an evicted bit that is stored alongside the current address in the object table entry.

In a variation on this embodiment, the atomic operation is a compare-and-swap operation that swaps the current address in the object table entry with the new address if a comparison operation between the object table entry and the address just copied from (appended to a cleared eviction bit) indicates a match.

In a variation on this embodiment, the object-addressed memory hierarchy includes an object cache, wherein a copy of the object can be accessed through a corresponding object identifier. Moreover, the object can be accessed through a physical address when the object is located in main memory.

In a variation on this embodiment, the system includes a translator that translates between object identifiers (used to address objects in the object cache) and physical addresses (used to address objects in main memory).

In a variation on this embodiment, the evicted indicator of an object is set whenever a cache line of that object is evicted from the object cache. Moreover, this eviction bit setting operation is performed atomically by maintaining ownership of a cache line containing the object table entry for the duration of the translation.

In a variation on this embodiment, the object is defined within an object-oriented programming system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
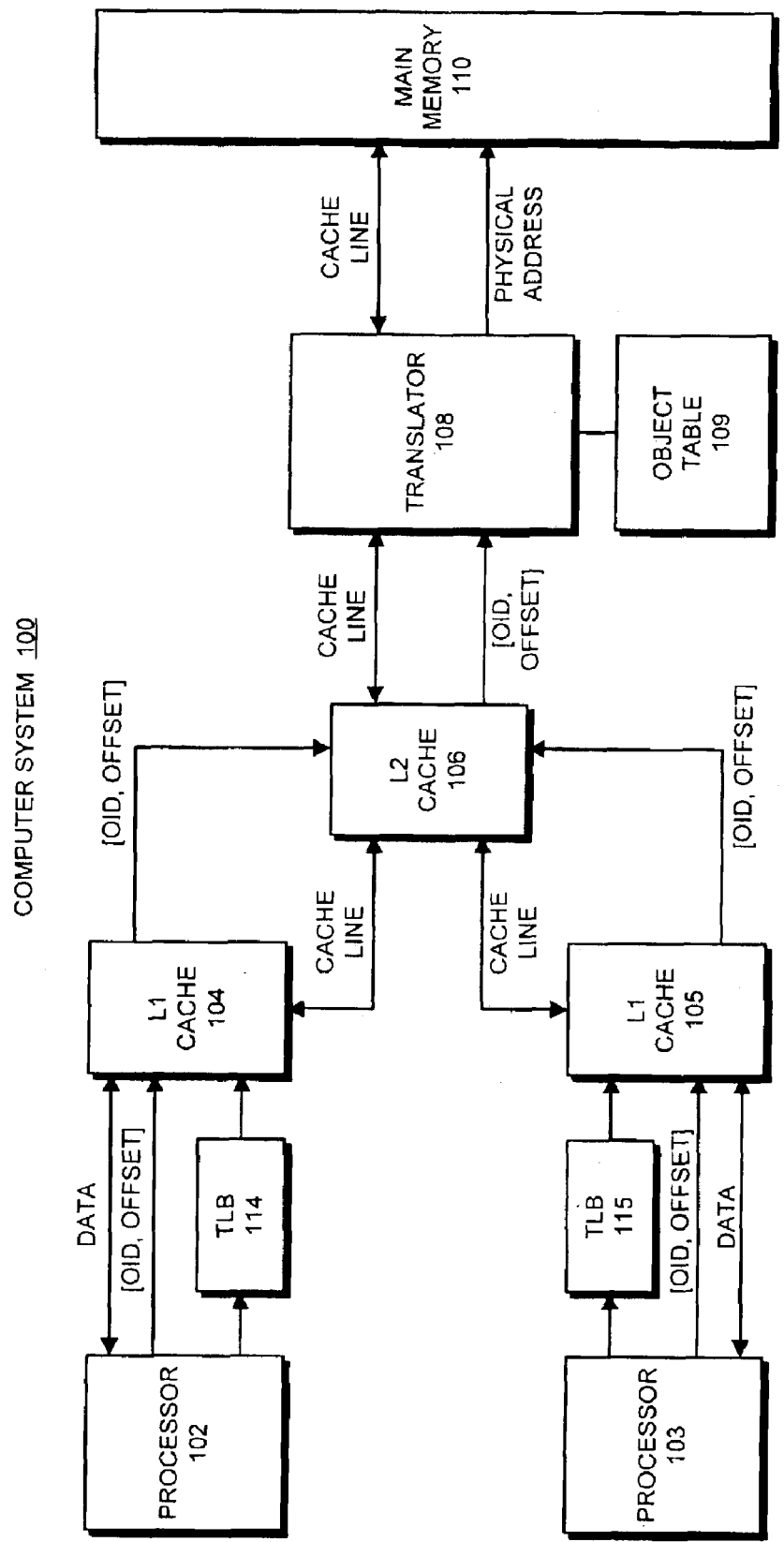
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 1, computer system 100 includes processors 102 and 103. Processors 102 and 103 access code and data from L1 caches 104 and 105, respectively. Note that L1 caches 104 and 105 can include unified instruction/data caches, or alternatively, separate instruction and data caches.

Processors 102 and 103 are associated with translation lookaside buffers (TLBs) 114 and 115, which facilitate translating virtual addresses into physical addresses for non-object references.

L1 cache 104 and L1 cache 105 make use of an extended address encoding procedure that enables L1 cache 104 to function as both a conventional cache and an object cache. For example, during a conventional load operation, a virtual address is sent from processor 102 to TLB 114. TLB 114 translates the virtual address into a physical address, which is subsequently used by L1 cache 104.

In contrast, during a load operation involving a portion of an object, processor 102 obtains the corresponding object identifier (OID) and offset and combines them to create an object address. This object address is embedded into an unused portion of the physical address space to produce an encoded address. Note that the higher order bits of this encoded address are different than the higher order bits of any physical address. This allows the system to distinguish an encoded address from a physical address. When the encoded address is subsequently sent from processor 102 to L1 cache 104, the encoded address bypasses TLB 114 and directly enters L1 cache 104. Note that only minor modifications are required to conventional cache designs in order to provide object caching using the above-described technique.

In order to request a non-object data item, such as a value from a normal virtual address, processor 102 generates a virtual address that is sent to TLB 114. TLB 114 translates this virtual address into a physical address, which is sent to L1 cache 104.

Note that after an object address is translated into an encoded address L1 cache 104, L1 cache 105 and L2 cache 106 can treat the encoded address in the same manner as a normal physical address.

If a given data item (or instruction) is not located within L1 cache 104 or L1 cache 105, it is retrieved from L2 cache 106. If it is not located within L2 cache 106, it is pulled into L2 cache 106 from main memory 110.

Unlike in a conventional memory hierarchy, a translator 108 is interposed between L2 cache 106 and main memory 110. Translator 108 converts an object address, comprising an object ID and an offset, into a corresponding physical address, which is sent to main memory 110.

If an object is not present within L2 cache 106, the encoded address is forwarded to translator 108. Translator 108 uses an object table 109 to translate the encoded address into a corresponding physical address. Each entry in object table 109 associates a given object ID with a corresponding physical address in main memory where the object resides.

When a cache miss for an object occurs in L2 cache 106, translator 108 intercepts the encoded address and extracts the object ID. Next, translator 108 uses the object ID to index into object table 109 obtain a corresponding base physical address. Once the base physical address is obtained, translator 108 converts the load request for the object into a load request for a physical address in main memory 110.

The system uses the base physical address and the offset to locate a specific cache line (or cache lines) in main memory 110. Fetching circuitry within translator 108 directs the normal load hardware to issue a load instruction to main memory 110. This fetching circuitry subsequently receives the cache line corresponding to the physical address. The fetching circuitry then forwards the cache to L2 cache 106.

Object cache lines differ from conventional physical cache lines because object cache lines can start on arbitrary word boundaries, whereas physical cache lines are delineated by larger power-of-two address boundaries. Hence, physical cache lines and object cache lines may not always align. For example, a physical cache line with a length of 64 bytes typically starts at a physical address that is a multiple of 64. Objects, however, may start on any physical address which is a multiple of four in a 32-bit system. Thus, a 64-byte object cache line starting at address 44 includes addresses (44 . . . 107). This overlaps with physical cache lines (0 . . . 63) and (64 . . . 127). In this case, the object is split across two physical cache lines. Hence, two load operations are required to retrieve the entire object cache line. Once both physical cache lines have been retrieved, the portions of the cache lines containing the object cache line, (44 . . . 63) and (64 . . . 107), are concatenated together to form the object cache line (44 . . . 107). Other portions of the physical cache lines are discarded.

In the event of an eviction from L2 cache 106, translator 108 converts the encoded address containing the object ID and the offset into a physical address. The fetching circuitry subsequently uses the physical address to generate one or more store operations to store the evicted cache line in main memory 110.

Note that processors 102 and 103 are configured to handle the extended address encoding procedure described above. In one embodiment of the present invention, a platform-independent virtual machine, such as a Java Virtual Machine, is modified to generate requests for portions of an object using an object ID and an offset. Moreover, in one embodiment of the present invention, processors 102 and 103 are configured to execute special instructions for performing load and store operations involving an object ID and an offset—in addition to normal load and store instructions that use virtual addresses.

Also note that the present invention does not handle overlapping copies of objects. Other mechanisms must be used to ensure that copies of objects do not overlap.

Although the present invention is described with reference to a computer system 100 with two levels of cache, the present invention can generally be used with any single-level or multi-level caching structure. Furthermore, although computer system 100 includes two processors, the present invention can generally be used with any number of processors.

Object Relocation Operation

Figure 2:
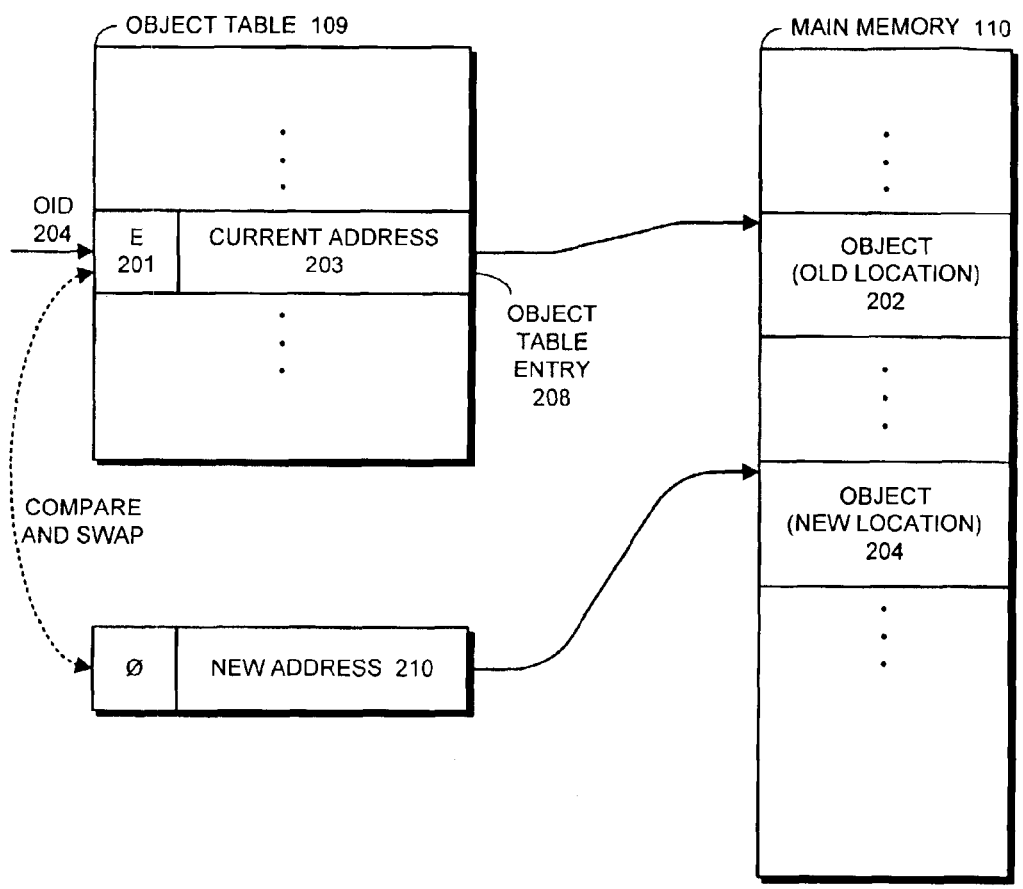
FIG. 2 illustrates an object relocation operation in accordance with an embodiment of the present invention.

FIG. 2 illustrates an object relocation operation in accordance with an embodiment of the present invention. In order to manipulate an object, the system manipulates ancillary data structures associated with the object. For example, in one embodiment of the present invention, each object defined within an object-oriented programming system is associated with an object table entry 208 that contains metadata associated with the object, such as the object's physical address.

Hence, an object can be accessed by using an object identifier (OID) 204 to reference an object table entry (OTE) 208 for the object from object table 109. (Note that object table 109 can itself be implemented as a table in main memory 112.) The current address 203 for the object is then retrieved from object table entry 108. This current address 203 is used to access the object from its old location 202 in main memory 110.

In order to relocate the object, the system first obtains a new location 204 for the object in main memory 110, and a new address 210 that specifies the start of the new location. The system then clears an evicted bit 201 in the object table entry 208 for the object. This evicted bit 201 is set whenever the corresponding object is modified in physical memory (but not when a corresponding object cache line is modified). Next, the system copies the object from the old location 202 to the new location 204.

After the copying is complete, the system performs an atomic operation that swaps the current address 203 in the object table entry with the new address 210 if the evicted bit remains clear. Otherwise, another processor (or the translator) has interfered with the relocation process, and the system performs the relocation operation again. This process is described in more detail below with reference to FIGS. 3–4. (Note that the CPU performing the relocation can interfere with the relocation if it should evict part of that object from its object cache, thus causing the translator to modify the in-memory version of the object. So in fact some of these problems apply even in a single-CPU system as long as it has a translator and an object cache.)

Process of Setting Evicted Bit

Figure 3:
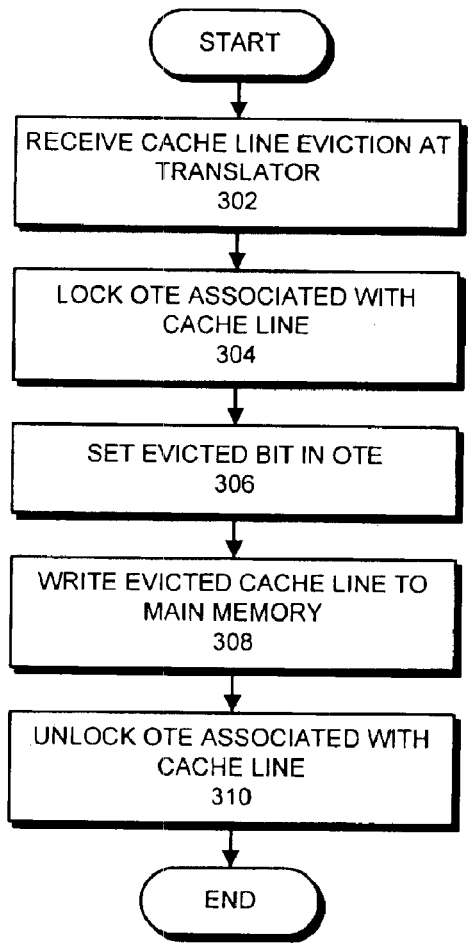
FIG. 3 presents a flow chart illustrating the process of setting an evicted bit during a cache line eviction in accordance with an embodiment of the present invention.

FIG. 3 presents a flow chart illustrating the process of setting evicted bit 201 during a cache line eviction in accordance with an embodiment of the present invention. Note that in the computer system illustrated in FIG. 1, a copy of an object in main memory 110 is typically written to during a cache line eviction operation or a cache flush operation that causes a cache line containing a portion of the object to be flushed out to main memory 110.

During this cache line eviction operation, translator 108 causes an evicted bit to be set in an object table entry corresponding to the object. During this process, the system receives a cache line eviction operation at translator 108 (step 302). Next, the system locks the object table entry 208 associated with the object, so that it cannot be modified by another process or processor (step 304). The system then sets the evicted bit 201 in object table entry 208 (step 306), and then writes the evicted cache line out to main memory 110 (step 308). The system then unlocks the object table entry associated with the cache line (step 310).

Process of Relocating an Object

Figure 4:
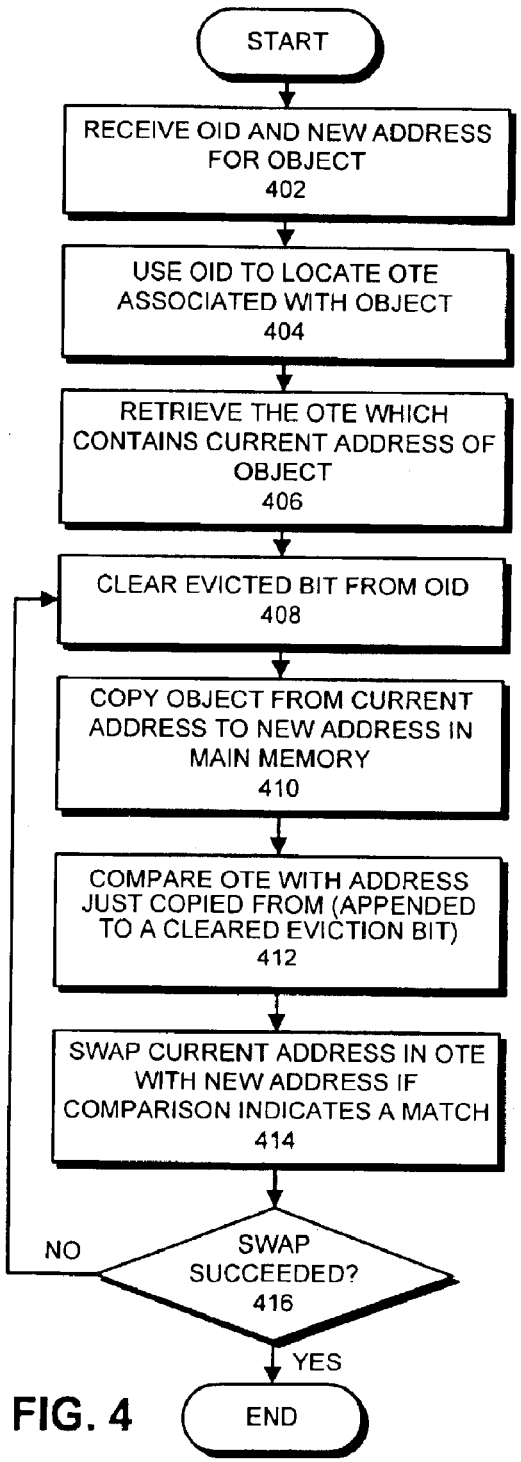
FIG. 4 presents a flow chart illustrating the process of relocating an object in accordance with an embodiment of the present invention.

FIG. 4 presents a flow chart illustrating the process of relocating an object in accordance with an embodiment of the present invention. The system starts by receiving an OID 204 for the object and a new address 210 for the object (step 402). Next, the system uses the OID to locate the object table entry (OTE) 208 associated with the object (step 404). Note that many possible mapping functions can be used for this purpose. In general, any suitable mapping function that maps an OID to a corresponding OTE can be used. The system then retrieves the OTE 208, which contains a current address 203 for the object (step 406).

Next, the system clears the evicted bit 201 in the OTE 208 (step 408), and then copies the object from the current address 203 to the new address 210 in main memory 110 (step 408). Next, if the evicted bit 201 in OTE 208 remains clear, the system then performs an atomic operation that swaps the current address 203 in OTE 208 with the new address 210. This can be accomplished, by performing a standard compare-and-swap operation that compares OTE 208 with the address just copied from (appended to a cleared eviction bit) (step 412), and then swaps current address 203 in OTE 208 with new address 210 if the comparison operation indicates a match (step 414).

If the evicted bit 201 has been set by an intervening cache line eviction operation involving the object, the system returns to step 408 to repeat the process. Note that if the relocation process is unsuccessful after a number of iterations through steps 408–416, other processes or processors are interfering with the copying process. In this case, the system may suspend the other processes or processors to allow the object relocation operation to take place.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for relocating an object in a computer system that provides an object-addressed memory hierarchy, comprising:

receiving a new address specifying to where the object is to be relocated in main memory;

retrieving an object table entry associated with the object, wherein the object table entry contains a current address for the object, which is used to translate an object identifier for the object into a corresponding physical address for the object in main memory;

clearing an evicted indicator from the object table entry, wherein the evicted indicator is set whenever the object is modified in main memory;

copying the object from the current address to the new address; and after the copying is complete, performing an atomic operation that swaps the current address in the object table entry with the new address if the evicted indicator remains clear.

2. The method of claim 1, wherein, if the copying is complete and the evicted indicator has been set, the method further comprises repeating the steps of clearing the evicted indicator, copying the object, and selectively performing the atomic operation until the object table entry is successfully updated to contain the new address.

3. The method of claim 1, wherein retrieving the object table entry involves:

receiving the object identifier for the object;

using the object identifier to locate the object table entry associated with the object; and retrieving the object table entry.

4. The method of claim 1, wherein the evicted indicator comprises an evicted bit that is stored alongside the current address in the object table entry.

5. The method of claim 4, wherein the atomic operation is a compare-and-swap operation that swaps the current address in the object table entry with the new address if the address just copied from with the evicted bit cleared matches the object table entry.

6. The method of claim 1, wherein the object-addressed memory hierarchy includes an object cache;

wherein a copy of the object in the object cache can be accessed through a corresponding object identifier; and wherein the object can be accessed through a physical address when the object is located in main memory.

7. The method of claim 6, further comprising using a translator to translate between object identifiers (used to address objects in the object cache) and physical addresses (used to address objects in main memory).

8. The method of claim 7, wherein the evicted indicator of an object is set whenever a cache line of that object is evicted from the object cache; and wherein the eviction bit setting operation is performed atomically by maintaining ownership of a cache line containing the object table entry for the duration of the translation.

9. The method of claim 1, wherein the object is defined within an object-oriented programming system.

10. An apparatus that relocates an object within a computer system that provides an object-addressed memory hierarchy, comprising:

a receiving mechanism configured to receive a new address specifying to where the object is to be relocated in main memory;

a retrieving mechanism configured to retrieve an object table entry associated with the object, wherein the object table entry contains a current address for the object, which is used to translate an object identifier for the object into a corresponding physical address for the object in main memory;

a clearing mechanism configured to clear an evicted indicator from the object table entry, wherein the evicted indicator is set whenever the object is modified in main memory;

a copying mechanism configured to copy the object from the current address to the new address; and a swapping mechanism, wherein after the copying is complete, the swapping mechanism is configured to perform an atomic operation that swaps the current address in the object table entry with the new address if the evicted indicator remains clear.

11. The apparatus of claim 10, wherein, if the copying is complete and the evicted indicator has been set, the clearing mechanism, the copying mechanism and the swapping mechanism continue to operate until the object table entry is successfully updated to contain the new address.

12. The apparatus of claim 10, wherein the retrieving mechanism is configured to:

receive the object identifier for the object;

use the object identifier to locate the object table entry associated with the object; and to retrieve the object table entry.

13. The apparatus of claim 10, wherein the evicted indicator comprises an evicted bit that is stored alongside the current address in the object table entry.

14. The apparatus of claim 13, wherein the swapping mechanism performs a compare-and-swap operation that swaps the current address in the object table entry with the new address if the address just copied from with the evicted bit cleared matches the object table entry.

15. The apparatus of claim 10, wherein the object-addressed memory hierarchy includes an object cache;

wherein a copy of the object in the object cache can be accessed through a corresponding object identifier; and wherein the object can be accessed through a physical address when the object is located in main memory.

16. The apparatus of claim 15, further comprising a translator that translates between object identifiers (used to address objects in the object cache) and physical addresses (used to address objects in main memory).

17. The apparatus of claim 16, further comprising a setting mechanism configured to set the evicted indicator of an object whenever a cache line of that object is evicted from the object cache; and wherein the setting mechanism is configured to set the eviction indicator atomically by maintaining ownership of a cache line containing the object table entry for the duration of the translation.

18. The apparatus of claim 10, wherein the object is defined within an object-oriented programming system.

19. A computer system that facilitates relocating an object, comprising:

a processor;

a main memory;

an object-addressed memory hierarchy;

an object cache within the object-addressed memory hierarchy;

a translator that translates between object identifiers, used to address objects in the object cache, and physical addresses, used to address objects in main memory;

wherein the processor is configured to receive a new address specifying to where the object is to be relocated in main memory;

wherein the processor is configured to retrieve an object table entry associated with the object, wherein the object table entry contains a current address for the object, which is used to translate an object identifier for the object into a corresponding physical address for the object in main memory;

wherein the processor is configured to clear an evicted indicator from the object table entry, wherein the evicted indicator is set whenever the object is modified in main memory;

wherein the processor is configured to copy the object from the current address to the new address; and wherein after the copying is complete, the processor is configured to perform an atomic operation that swaps the current address in the object table entry with the new address if the evicted indicator remains clear.

20. The computer system of claim 19, wherein, if the copying is complete and the evicted indicator has been set, the processor repeats the steps of clearing the evicted indicator, copying the object, and selectively performing the atomic operation until the object table entry is successfully updated to contain the new address.

21. The computer system of claim 19, wherein while retrieving the object table entry, the translator is configured to:

receive the object identifier for the object;

use the object identifier to locate the object table entry associated with the object; and to retrieve the object table entry.

22. The computer system of claim 19, wherein the evicted indicator comprises an evicted bit that is stored alongside the current address in the object table entry.

23. The computer system of claim 19, wherein the atomic operation is a compare-and-swap operation that swaps the current address in the object table entry with the new address if the address just copied from with the evicted bit cleared matches the object table entry.

* * * * *